United States Patent
Haring et al.

(10) Patent No.: US 12,452,078 B2
(45) Date of Patent: Oct. 21, 2025

(54) MULTIPLE-KEY VERIFICATION INFORMATION FOR MOBILE DEVICE IDENTITY DOCUMENT

(71) Applicant: Apple Inc., Cupertino, CA (US)

(72) Inventors: Martijn T. Haring, Cupertino, CA (US); Ahmer A. Khan, Milpitas, CA (US); Xiangying Yang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 236 days.

(21) Appl. No.: 17/033,564

(22) Filed: Sep. 25, 2020

(65) Prior Publication Data

US 2021/0160081 A1 May 27, 2021

Related U.S. Application Data

(60) Provisional application No. 62/941,603, filed on Nov. 27, 2019.

(51) Int. Cl.
| | |
|---|---|
| *H04L 29/06* | (2006.01) |
| *H04L 9/14* | (2006.01) |
| *H04L 9/30* | (2006.01) |
| *H04L 9/32* | (2006.01) |

(52) U.S. Cl.
CPC .............. *H04L 9/3247* (2013.01); *H04L 9/14* (2013.01); *H04L 9/30* (2013.01); *H04L 9/3231* (2013.01)

(58) Field of Classification Search
CPC . H04L 9/3247; H04L 9/14; H04L 9/30; H04L 9/3231; H04L 9/321; H04L 9/0897; H04L 2209/80; H04L 9/0825; H04L 9/0866; H04L 9/3249; H04L 9/3252; H04L 63/1416; H04L 9/0844; H04L 9/32; H04L 63/0442; H04L 63/061; H04L 63/062; H04L 63/08; H04L 63/0861; H04L 2463/061; H04M 2215/0156;

(Continued)

(56) References Cited

U.S. PATENT DOCUMENTS

| | | | |
|---|---|---|---|
| 8,947,214 B2 | 2/2015 | Solomon | |
| 9,602,288 B1* | 3/2017 | Mikulski | ............... H04L 9/088 |
| 2006/0095388 A1* | 5/2006 | Brown | ............... H04L 9/3263 |
| | | | 705/67 |
| 2008/0127314 A1* | 5/2008 | Rowley | ............... H04L 63/123 |
| | | | 726/5 |
| 2009/0132813 A1 | 5/2009 | Schibuk | |
| 2013/0036459 A1 | 2/2013 | Liberman et al. | |

(Continued)

*Primary Examiner* — Joseph P Hirl
*Assistant Examiner* — Leynna Truvan
(74) *Attorney, Agent, or Firm* — Kowert, Hood, Munyon, Rankin & Goetzel, P.C.; Paul T. Seegers; Dean M. Munyon

(57) ABSTRACT

Techniques are disclosed relating to authenticating a user with a mobile device. In various embodiments, a mobile device receives a request to provision the mobile device with identification information from an identification document issued by an authority to a user for establishing an identity of the user. In response to the received request, the mobile device issues a request for verification information signed by the authority and usable to verify the identification information. The issued request identifies multiple public keys of the mobile device, each having a respective corresponding private key for generating a signature usable to verify the identification information. The mobile device receives and stores the signed verification information, the signed verification information including the plurality of public keys. In some embodiments, the mobile device receives a request provide, at least, a portion of the identification information and selects one of the private keys to generate a signature.

19 Claims, 7 Drawing Sheets

(58) Field of Classification Search
CPC ......... H04N 2201/3233; H04N 7/1675; H04N
21/6334; H04N 21/25875; H04N
21/25816; H04N 21/4415; H04H 60/23;
H04W 12/041; H04W 12/06; H04W
12/065; G01C 21/3415; G01C 21/3664;
G01J 5/025; G01R 1/025; G03G 15/5016;
G03G 15/5091; G03G 21/1892; G05B
23/0272; G05B 2219/13144; G05B
2219/24162; G05B 2219/24167; G05B
2219/32153; G06F 3/01; G06F 11/3438;
G06F 15/0225; G06F 21/31; G06F 21/30;
G06F 21/45; G10H 2240/101; G06Q
20/3674; G06Q 20/4093; G11B 19/122

See application file for complete search history.

(56) References Cited

U.S. PATENT DOCUMENTS

| | | | |
|---|---|---|---|
| 2013/0124870 A1* | 5/2013 | Rosati | H04L 9/3297 |
| | | | 713/168 |
| 2013/0243266 A1 | 9/2013 | Lazzouni | |
| 2013/0282438 A1 | 10/2013 | Hunter et al. | |
| 2015/0095648 A1* | 4/2015 | Nix | H04L 9/32 |
| | | | 713/170 |
| 2015/0213659 A1 | 7/2015 | Marthinussen | |
| 2016/0241389 A1* | 8/2016 | Le Saint | H04L 9/0844 |
| 2018/0173871 A1* | 6/2018 | Toth | H04W 12/126 |
| 2018/0262504 A1* | 9/2018 | Frederick | H04L 9/006 |
| 2018/0278417 A1* | 9/2018 | Choi | H04L 9/083 |
| 2019/0097793 A1* | 3/2019 | Nix | H04L 63/0272 |
| 2019/0140844 A1* | 5/2019 | Brown | H04L 63/0823 |
| 2019/0237169 A1* | 8/2019 | Culver | G06F 9/547 |

* cited by examiner

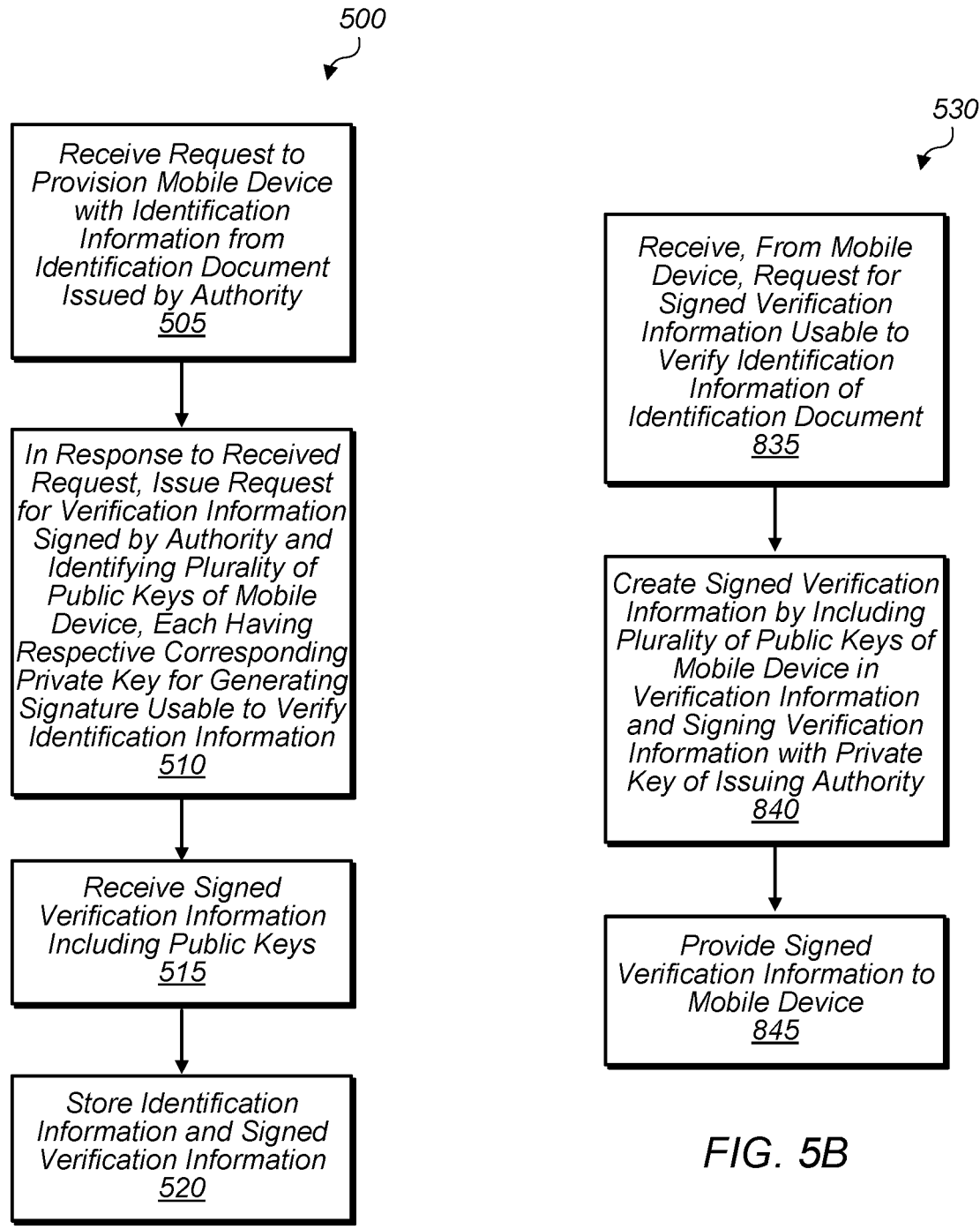

MULTIPLE-KEY VERIFICATION INFORMATION FOR MOBILE DEVICE IDENTITY DOCUMENT

The present application claims priority to U.S. Prov. Appl. No. 62/941,603, filed Nov. 27, 2019, which is incorporated by reference herein in its entirety.

BACKGROUND

Technical Field

This disclosure relates generally to mobile devices, and, more specifically, to authenticating a user with a mobile device.

Description of the Related Art

A person may carry various forms of identification that can be used to authenticate a user. For example, modern passports (called e-Passports) may include an electronic chip that stores a passport holder's name, date of birth, and other forms of information. When a person is passing through customs, the person may present the passport to a customs officer, who places the passport on a reader to extract information stored in the passport. Upon verifying the information printed on the passport against the internally stored information, the officer may confirm the identity of the holder and allow the holder passage through customs.

BRIEF DESCRIPTION OF THE DRAWINGS

FIGS. 5A-5C are flow diagrams illustrating embodiments of methods performed by components of the system.

Figure 1:
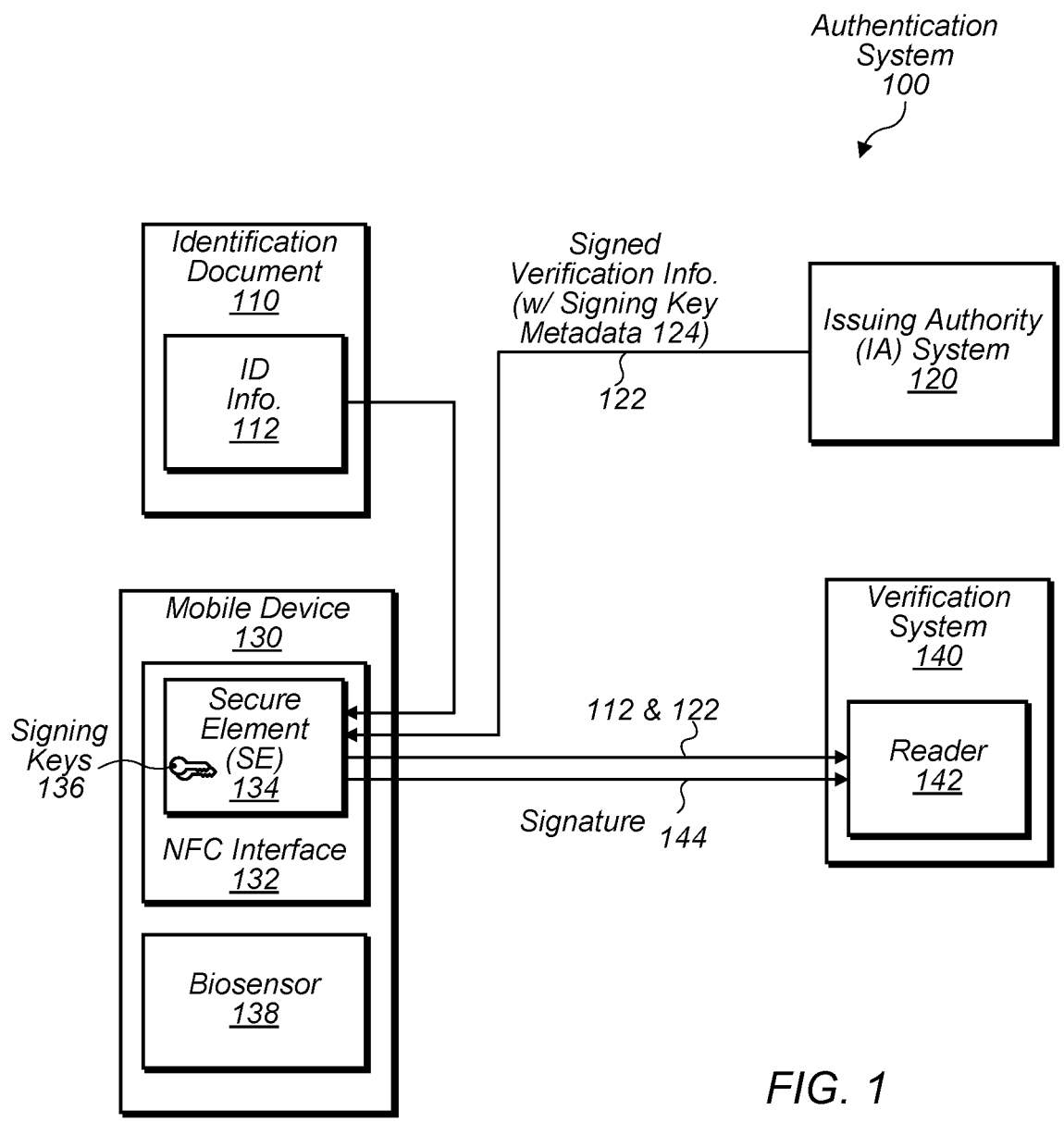
FIG. 1 is a block diagram illustrating one embodiment of a system for authenticating a user with a mobile device.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "biosensor configured to collect biometric information" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a processor having eight processing cores, the terms "first" and "second" processing cores can be used to refer to any two of the eight processing cores. In other words, the "first" and "second" processing cores are not limited to logical processing cores 0 and 1, for example.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

The present disclosure describes embodiments in which a person may present identification information through a mobile device instead of presenting a traditional form of identification. As will be described below, in various embodiments, a mobile device includes a short-range communication interface (e.g., a near-field communication (NFC) radio) and a secure element (or some other form of storage in other embodiments) configured to store identification information of a user. As used herein, the term "secure element" is to be interpreted according to its understood meaning in the art, and refers to circuitry that is configured to store information in a tamper-resistant manner that resists unauthorized extraction of that information. In such an embodiment, when the user presents the mobile device to a corresponding reader attempting to authenticate the user, the mobile device may provide the identification information to the reader. For example, when the user is passing through a customs checkpoint, the user may present the mobile device to a reader operated by a customs agent. The secure element may then convey the passport information to the reader. In some instances, being able to authenticate using a mobile device may help expedite establishing an identity of user and provide the convenience of performing an authentication without presenting the identification document.

To facilitate this form of authentication, the mobile device may perform an enrollment process that, in various embodiments, includes the mobile device receiving signed verification information useable to verify that the identification information being presented is valid. For example, an issuing authority associated with the identification document may sign a set of digests generated from the identification information. As will be described in greater detail below, in various embodiments, the mobile device (and specifically the secure element in some embodiments) may generate one or more public key pairs to be bound to the identification information in order to facilitate performance of various operations associated with verification of the identification information. The mobile device may then provide the public keys of these pairs to the issuing authority for inclusion in the signed verification information. For example, the mobile device may generate a public key pair associated with the mobile device's ability to perform a biometric authentication of the user such that the mobile device generates a signature using the private key in response to a successful biometric authentication. If the issuing authority deems that the mobile device is sufficiently trustworthy, the authority may include the corresponding public key in the signed verification information to indicate that the biometric authentication may be relied upon. Accordingly, if a merchant is subsequently performing an online transaction and receives a signature generated using the private key, the merchant can determine based on the signed verification information that the mobile device has successfully confirmed, via performance of the biometric authentication, that the current user of the mobile device is the correct holder of the identification document. As another example, the mobile device may provide the public key corresponding to a private key maintained in a fast identity online (FIDO) compliant dongle in order to allow such a device to be used when verifying an identity of the user. Other examples of such keys will be discussed in greater detail below. In allowing greater flexibility to bind keys to the identification information of an identification document, the mobile device may allow for a greater number of applications in which the mobile device can be used in lieu of the original identification document.

Turning now to FIG. 1, a block diagram of an authentication system 100 is depicted. In the illustrated embodiment, authentication system 100 includes an identification document 110, issuing authority (IA) system 120, mobile device 130, and verification system 140. As shown, mobile device 130 may include a near-field communication (NFC) interface 132, a secure element (SE) 134, and a biosensor 138. Verification system 140 may include a reader 142. In some embodiments, system 100 may be arranged differently than shown. For example, in some embodiments, mobile device 130 may not include SE 134 (or SE 134 may be external to NFC interface 132), mobile device 130 may not include biosensor 138, etc.

Identification document 110 corresponds to any suitable form physical identification usable to establish an identity of a holder such as a passport, driver license, government-issued ID, student ID, etc. Accordingly, document 110 may present various forms of information 112 about a user including, for example, a user's name, date of birth, place of residence, etc. Document 110 may also include a photograph of the document holder. Document 110 may also include a unique identification number such as passport number, driver license number, etc. Document 110 may also identify the issuing authority such as the particular country, government, university, etc. In various embodiments, document 110 may not only depict this information on the face of the document, but also store this information in circuitry or a magnetic strip embedded in the document. For example, in some embodiments, document 110 includes RFID tag for storing this information 112. In such an embodiment, document 110 may store information in compliance with known standards such as the ISO/IEC 18000 standards and/or ISO/IEC 14443 standards. In other embodiments, document 110 includes other forms of circuitry such as a smart card chip compliant with ISO/IEC 7816, a Bluetooth™ enabled chip, etc. As will be discussed below, mobile device 130 may attempt to store this information 112, so that mobile device 130 can be used to authenticate a user in lieu of presenting identification document 110.

IA system 120, in various embodiment, is a computer system configured to facilitate enrollment of mobile device 130. In the illustrated embodiment, IA system 120 is operated by the authority that issued document 110 (or a third party that interacts with the issuing authority). In some embodiments, system 120 maintains a database, which may include the information stored in document 110, an indication of whether document 110 is still valid (e.g., has not been reported as being lost), etc. In some embodiments, IA system 120 maintains a trusted public key pair for signing and verifying information such as signed verification information 122 discussed below. In some embodiments, IA system 120 may further implement a certificate authority (CA) capable of issuing certificates for received certificate signing requests (CSRs). As used herein, the term "digital certificate" (or "certificate") is to be interpreted according to its understood meaning in the art, and refers generally to an electronic document that is usable to prove ownership of a public key and is signed by a trusted certificate authority (CA).

Mobile device 130 corresponds to any suitable form of device such as mobile phone, tablet, wearable device (e.g., a watch), laptop, etc. As noted above, in various embodiments, mobile device 130 is configured to store identification information 112 from document 110 and present that information 112 to verification system 140 in order to authenticate a user of mobile device 130 as the holder of document 110. In the illustrated embodiment, mobile device 130 interacts with verification system 140 using via NFC interface 132 and secure element 134; however, mobile device 130 may interact differently in other embodiments.

NFC interface 132, in various embodiments, is a short-range radio circuit configured to implement one or more NFC standards such as those defined by ISO/IEC 18000. In other embodiments, interface 132 may implement other short-range radio access technologies (RATs) such as Bluetooth™, ZigBee™, Wi-Fi™, etc. In some embodiments, mobile device 130 may also include a long-range radio for interacting with systems 120 and 140 such as one supporting various cellular RATs.

SE 134, in various embodiment, is secure circuitry configured to store identity information 112 from identification document 110. Accordingly, SE 134 employs various techniques to resistant extraction of information 112 such as using strong encryption, having a restricted access interface, attempting to destroy information 112 in response to tamper detection, etc. In some embodiments, SE 134 is configured to store all information 112 that is also presented by identification document 110. In other embodiments, SE 134 is configured to store a token that is usable by verification system 140 to retrieve some or all of this information 112 from IA system 120. For example, in one embodiment, rather than store a photograph presented on identification document 110, SE 134 stores a token that is usable to retrieve this photograph—thus enabling SE 134 to conserve memory. (In still other embodiments, a memory other than a secure element may be used to store information 112 for mobile device 130.) In the illustrated embodiment, SE 134 stores one or more signing keys 136 used to facilitate verification of information 112 as will be discussed in greater detail below. In some embodiment, SE 134 may rely on biosensor 138 to perform a user authentication before releasing identification information 112 from SE 134.

Biosensor 138, in various embodiments, is configured to collect biometric data to authenticate a current user of mobile device 130. Biosensor 138 may correspond to any suitable sensor configured to detect biometric data for a user of mobile device 130. Biometric data is data that uniquely identifies the user among other humans (at least to a high degree of accuracy) based on the user's physical or behavioral characteristics. For example, in some embodiments, biosensor 138 is a camera sensor that captures facial data to perform facial recognition. In some embodiments, other types of biometric data may be captured by biosensor 138 such as voice recognition (identifying the particular user's voice), finger print scanning, iris scanning, etc. In other embodiments, the user may be authenticated differently such as, in one embodiment, being presented with a prompt on a touch screen of mobile device 130 and asked to enter a passcode.

Prior to interacting with verification system 140, mobile device 130 may perform an enrollment process with IA system 120 in order for SE 134 to store identification information 112 and receive signed verification information 122 used to confirm the validity of information 112. In various embodiments, mobile device 130 begins enrollment by reading at least a portion of information 112 from identification document 110 such as the identification number and the name of the person that holds document 110. For example, mobile device 130 may use a camera of device 130 to capture information from document 110, use NFC interface 132 to read this information from RFID tag of document 110, have a user manually enter this information, etc. Upon reading this information, SE 134 may encrypt this information and communicate it in an enrollment request to IA system 120. IA system 120 may then attempt to validate this request such as confirming that the request is coming from a phone operated by the holder of document 110. In some embodiments, IA system 120 may validate this request through one or more back channels such as relying on a trusted person (e.g., a customs agent) to confirm that device 130 is in possession of document 110's holder at the time of enrollment.

In various embodiments, once the IA system 120 has successfully validated the request, system 120 provides verification information 122 signed using the trusted private key maintained by system 120. In some embodiments, verification information 122 includes a signed copy of the identification information 112 presented on document 110—some or all of this information 112 may come from system 120 directly (as opposed to directly from identification document 110). A verification of identification information 112 may thus include evaluating the included information 112 against the included signature from IA system 120. In other embodiments, signed verification information 122 includes a set of signed digests generated from different portions identification information 112 such as a first digest generated from the holder's name, a second digest generated from the holder's age, etc.—thus, a verification may include regenerating the digests from the presented identification information 112 and comparing them against those in signed verification information 122. Such an implementation may be useful as mobile device 130 may be able to provide only a portion of identification information 112 (e.g., the holder's name but not the holder's home address), which can be verified using the one or more applicable digests. In still other embodiments, verification information 122 includes a signed token usable to obtain a copy of information 122 from IA system 120.

In various embodiments, IA system 120 may also include signing key metadata 124 for signing keys 136 in signed verification information 122 as shown in FIG. 1. As noted above, during the enrollment process, mobile 130 may generate public key pairs to be bound to identification information 112 in order to facilitate performance of various operations associated with verification of identification information 112. As will be described below with respect to FIG. 2, mobile device 130 may provide the public keys of these pairs to IA system 120 for inclusion in signing key metadata 124 along with a description of their respective uses. The private keys (shown as signing keys 136) may be used to generate signatures 144 from the provided identification information 112 when those operations are performed. As one example discussed mentioned above and discussed below, SE 134 may generate a public key pair associated with mobile device 130's ability to perform a biometric authentication such that the private signing key 136 is only used to generate a signature 144 if a successful biometric authentication is performed. If verification system 140 later receives such a signature 144 generated from this key 136, it can verify it using the public key included in signing key metadata 124 and know that, upon verification of the signature 144, a successful biometric authentication was performed using biosensor 138. Signatures 144 generated using signing keys 136 may use any suitable signature algorithm such as digital signature algorithm (DSA), elliptic-curve DSA (ECDSA), ECDSA with the secure hash algorithm (SHA), keyed-hash algorithms (e.g., keyed-hash message authentication code (HMAC)), etc. In some embodiments, rather than generate signatures 144 directly, signing keys 136 may be used to derive other keys that are used to produce signatures 144. Accordingly, as used herein, describing a key as being used to sign some data refers to that key being used as an input into the signature/MAC operation or being used to derive a key that is the input into the signature/MAC operation. As will also be described with respect to FIG. 2, signed verification information 122 including signing key metadata 124 may be included in a data structure (referred to below as a mobile security object), which may be conveyed with a signature 144 to verification system 140 for verification of provided identification information 112.

Verification system 140, in various embodiment, is a computer system configured to authenticate a person providing identification information 112 via mobile device 130. In some embodiments, verification system 140 is operated by an entity associated with the issuing authority. For example, a customs agent may be operating verification system 140 to confirm the identity of a user before permitting the user to pass through a customs checkpoint. In some embodiments, verification system 140 may be operated by a merchant attempting to verify a user's identity to facilitate a financial transaction between the user and the merchant. In the illustrated embodiment, verification system 140 uses reader 142, which may include a short-range radio for communicating with NFC interface 132 in order to read the identification information 112 stored in mobile device 130. In some embodiments, reader 142 may also include a display that presents the information 112 to a reviewer such as picture of the holder of identification document 110. In other embodiments, verification system 140 may communicate with mobile device 130 in a manner that does not use reader 142 such during performance of an online transaction. In various embodiments, verification system 140 confirms the validity of identification information 112 provided by mobile device 130 using signed verification information 122 and signature 144.

Embodiments of the enrollment and authentication processes are described in further detail below with respect to FIGS. 3 and 4.

Figure 2:
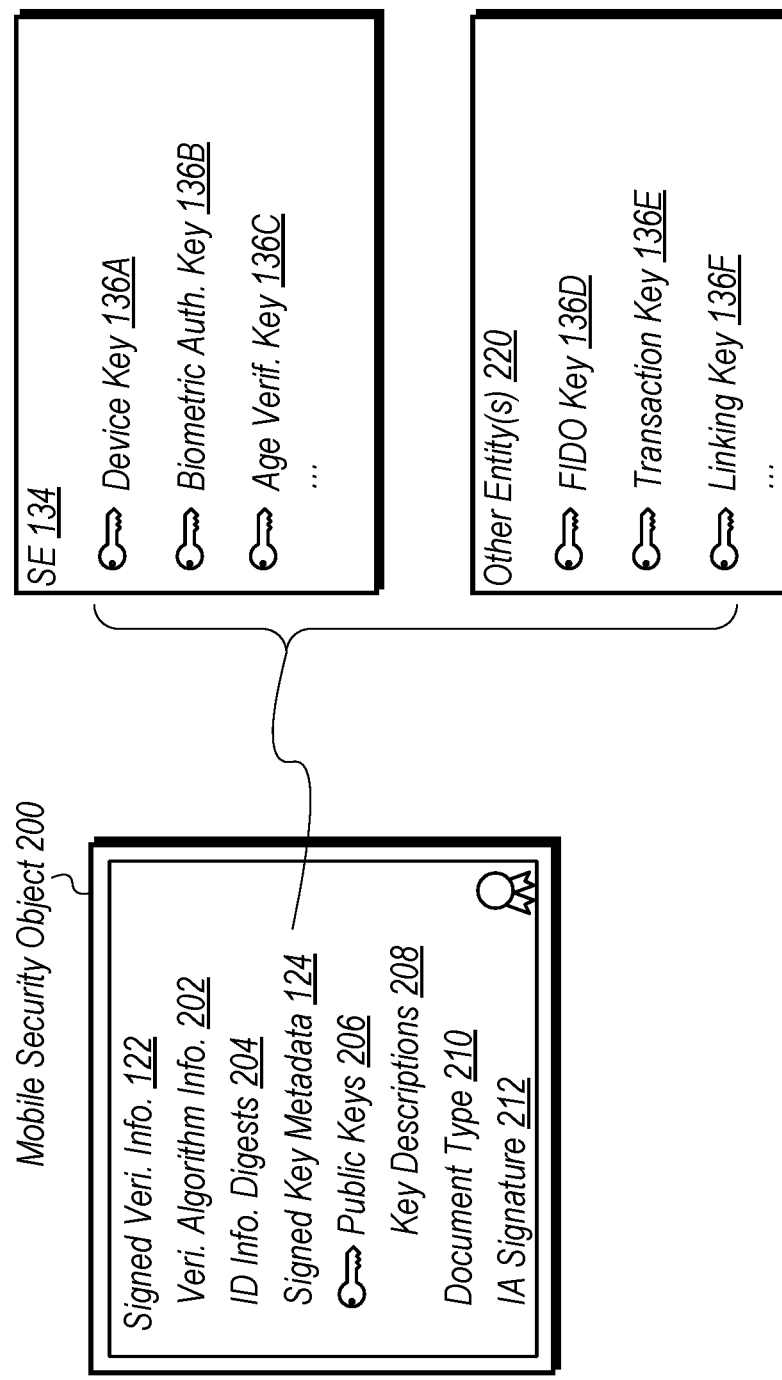
FIG. 2 is a block diagram illustrating one embodiment of verification information provided by an issuing authority.

Turning now to FIG. 2, a block diagram of a mobile security object 200 including signed verification information 122 corresponding to a set of signing keys 136A-F is depicted. In the illustrated embodiment, signed verification information 122 includes verification algorithm information 202, identification information digests 203, signed key metadata 124 including public keys 206 and key descriptions 208, document type 210, and an IA signature 212. In some embodiments, information 122 may include more (or less) elements than depicted.

Verification algorithm information 202, in various embodiments, identifies the underlying algorithm used to generate digests 204. For example, information 202 may indicate that that SHA, message authentication code (MAC), or some other digest generating algorithm is being used. Accordingly, verification system 140 may review this field before comparing digests 204 against digests generated from identification information 112.

Identification information digests 204, in various embodiments, are digests generated by IA system 120 from portions of identification information 112 and signed with IA signature 212. Accordingly, when verification system 140 is attempting to verify identification information 112 provided by mobile device 130, system 140 may generate digests from the provided information 112 and compare the digests against signed digests 204 to verify that the provided information 112 is correct.

Public keys 206, in various embodiments, are the signed public keys corresponding to signing keys 136. Accordingly, when verification system 140 is attempting to verify a digital signature 144 produced using a particular one of keys 136, system 140 may retrieve the appropriate public key 206 for that particular key 136.

Key descriptions 208, in various embodiments, describe the functions of public keys 206 and their corresponding signing keys 136. For example, descriptions 208 may define conditions that should be met before a key 136 can be used such as mandating a biometric authentication before a key 136 can be used to sign a block of data. Descriptions 208 may also limit what data is permitted to be signed by a given key 136 such as limiting a key 136 to signing data associated with a particular namespace.

Document type 210, in various embodiments, identifies the type of identification document 110. For example, type 210 may identify document 110 as a driver license, passport, etc. Type 210 may also identify the issuer of document 110.

IA signature 212, in various embodiments, is the signature generated from verification information 122 using a private key maintained by IA system 120 in order to preserve the integrity of information 122. Accordingly, verification system 140 may verify the content of information 122 against signature 212 when verifying identification information 112 provided by mobile device 130. IA signature 212 may be generated using any suitable algorithm such as those noted above.

As mentioned above, SE 134 may include multiple signing keys 136 used to generate signatures for various purposes. In the illustrated embodiment, SE 134 includes a device key 136A, biometric authentication key 136B, and age verification key 136C; however, SE 134 may include more (or less) keys 136 in other embodiments.

Device key 136A, in various embodiments, is a device-specific private key used to bind identification information 112 to a particular mobile device 130. Accordingly, when mobile device 130 provides identification information 112 to verification system 140, SE 134 may use device key 136A to sign the information 112 being provided to verification system 140 in order prove that it was the same device that initially interfaced with IA system 120 during enrollment. Device key 136A may be used, for example, to prevent identification information 112 from being cloned to another device, which could be used to authenticate the user.

Biometric authentication key 136B, in various embodiments, is a private key that is used to generate a signature 144 if mobile device 130 is able to confirm that the current user of mobile device 130 is also the holder of identification document 110. For example, IA system 120 may determine that mobile device 130 includes a biosensor 138 and is sufficiently trustworthy to perform a local authentication to confirm the identity of the current user. As such, IA system 120 may include the public key 206 corresponding to signing key 136B in signed verification information 122 and indicate in description 208 that the public key 206 is associated with an ability of mobile device 130 to perform biometric authentications—and that such a biometric authentication is sufficient to be relied upon. Such a key 136B may be used, for example, in an online transaction in which a merchant is not able to directly interact with a user—and thus confirm in-person the identity of the user matches the holder of identification document 110.

Age verification key 136C, in various embodiments, is a private key that is used to generate a signature 144 if mobile device 130 is able to confirm that an age of the user of mobile device 130 satisfies a threshold without mobile device 130 providing the user's age. For example, a merchant operating verification system 140 may specify that it wants to 1) know whether a user exceeds a particular age threshold (e.g., is over 21 years of age) and 2) be provided with a corresponding photograph of the user that is present on identification document 110. If IA system 120 determines that mobile device 130 is sufficiently trustworthy to perform this assessment, IA system 120 may include the public key 206 corresponding to signing key 136C in signed verification information 122 and indicate in description 208 that the public key 206 is associated with an ability of mobile device 130 to verify an age of the user. Accordingly, if the merchant receives a signature 144 generated from key 136C, the merchant can conclude that mobile device 130 verified that an age identified in identification information 112 for the user satisfies the threshold without the merchant actually receiving the user's age. In doing so, mobile device 130 is able to protect a user's identification information, yet still adequately answer the merchant's inquiry. Similar keys 136 may also be used to confirm whether a holder of an identification document satisfies other attributes without providing those attributes (or at least providing some information about that attribute without providing all information about that attribute).

In some embodiments, signed key metadata 124 may include public keys 206 and key descriptions 208 for signing keys 136 held by entities 220 other than SE 134, which may even be external to mobile device 130. For example, in the illustrated embodiment, other entities 220 may maintain a fast identity online (FIDO) key 136D, transaction key 136E, and linking key 136F.

Fast Identity Online (FIDO) key 136D, in various embodiments, is a private key maintained externally to mobile device 130. For example, in some embodiments, key 136D may be maintained in an external dongle that is inserted into a port (e.g., a USB port) of mobile device 130 to permit a signature 144 to be generated from key 136D. Such a key 136D may be used as an alternative to storing a key 136 in SE 134. In the illustrated embodiment, key 136D is maintained in a manner that is compliant with FIDO standards; however, in other embodiments, key 136D may be maintained differently.

Transaction key 136E, in various embodiments, is an example of a private key held by entity 220 other than mobile device 130 and that is authorized by IA system 120 to provide supplemental information related to the providing of identification information 112. In particular, key 136E may be used by an entity facilitating a transaction between a user and a merchant to convey supplemental transaction information, which may be assessed by the merchant in conjunction with assessing the provided identification information 112. For example, the entity may be associated with a transaction instrument being used in the transaction and use key 136E to sign fraud data being conveyed to the merchant. In the illustrated embodiment, IA system 120 may bind this supplemental information to identification information 112 by including the corresponding public key 206 and a description 208 in signed verification information 122.

Linking key 136F, in various embodiments, is another example of a private key held by entity 220 other than mobile device 130 and that is authorized by IA system 120 to provided supplemental information related to the providing of identification information 112. In particular, key 136F may be used by an entity wanting to link content of one or more other documents to identification information 112. For example, the entity may be a vehicle insurance provider that wants to link information of an insurance policy to identification document 110. In the illustrated embodiment, IA system 120 may include the corresponding public key 206 and a description 208 in signed verification information 122 in order to allow the insurance provider to use key 136F to sign the insurance-policy information—thus binding the insurance-policy information to identification information 112.

Figure 3:
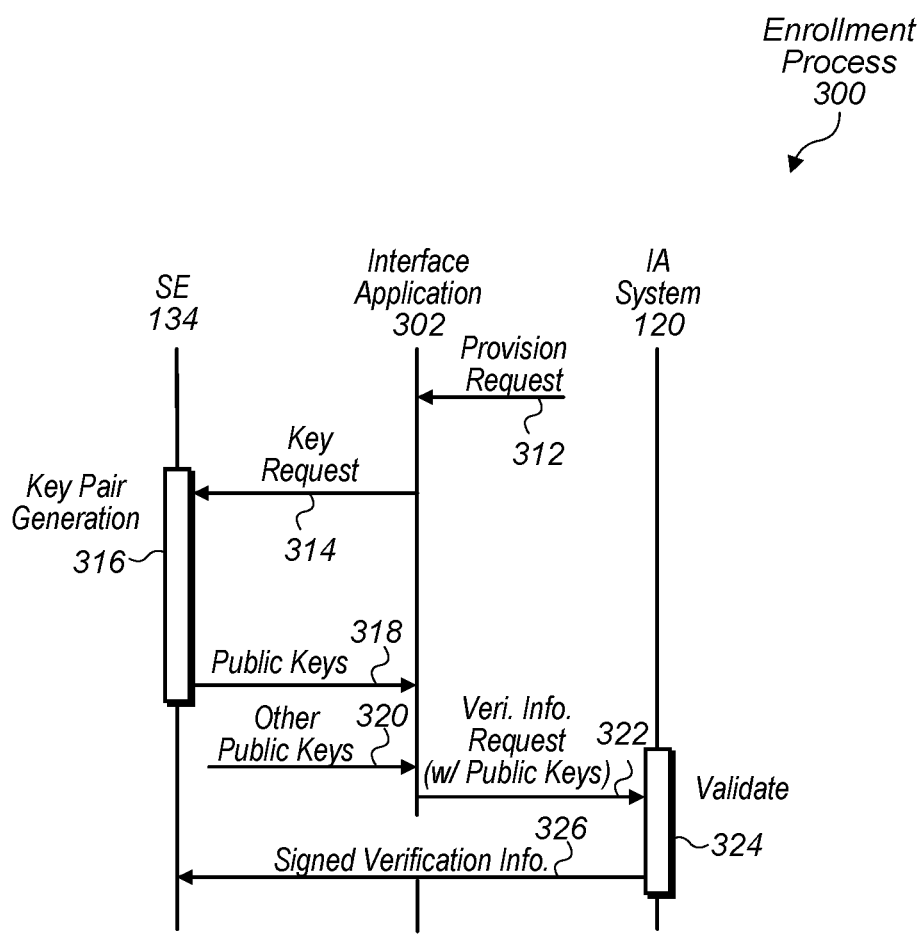
FIG. 3 is a communication diagram illustrating one embodiment of an enrollment process used by the authentication system.

Turning now to FIG. 3, a communication diagram of an enrollment process 300 is depicted. As discussed above, in various embodiments, enrollment process 300 may be performed by mobile device 130 in order to obtain identification information 112 and signed verification information 122 usable in a subsequent authentication process. In the illustrated embodiment, enrollment process 300 includes performance of steps 312-322 by interface application 302, SE 134, and IA system 120. Interface application 302, in various embodiments, is executable to facilitate interfacing among SE 134, a user of mobile device 130, and IA system 120 when enrollment is performed (as well as SE 134, a user of mobile device 130, and verification system 140 during authentication as discussed below with FIG. 4). In some embodiments, process 300 may be implemented differently than shown.

As shown, process 300 begins at 312 with interface application 302 receiving a request to provision mobile device 130 with identification information 112 of identification document 110. For example, interface application 302 may present a prompt on a display of mobile device 130 asking the user if he or she would like to use mobile device 130 as an electronic identification document. If the user confirms, interface application 302 may, at 314, send a request for SE 134 to generate, at 316, one or more public key pairs including signing keys 136 and corresponding public keys 206. At 318, interface application 302 may receive the generated public keys 206 for communication to IA system 120. At 320, interface application 302 may also be provided with the public keys for any of the entities 220 other than SE 134 such as the public keys corresponding to signing keys 136D-F. At 322, interface application 302 may include these keys in its request to IA system 120 for signed verification information 122. After successfully validating this request at 324, IA system 120 may provide the signed verification information 122 at 326, which, in the illustrated embodiment, is stored in SE 134.

Figure 4:
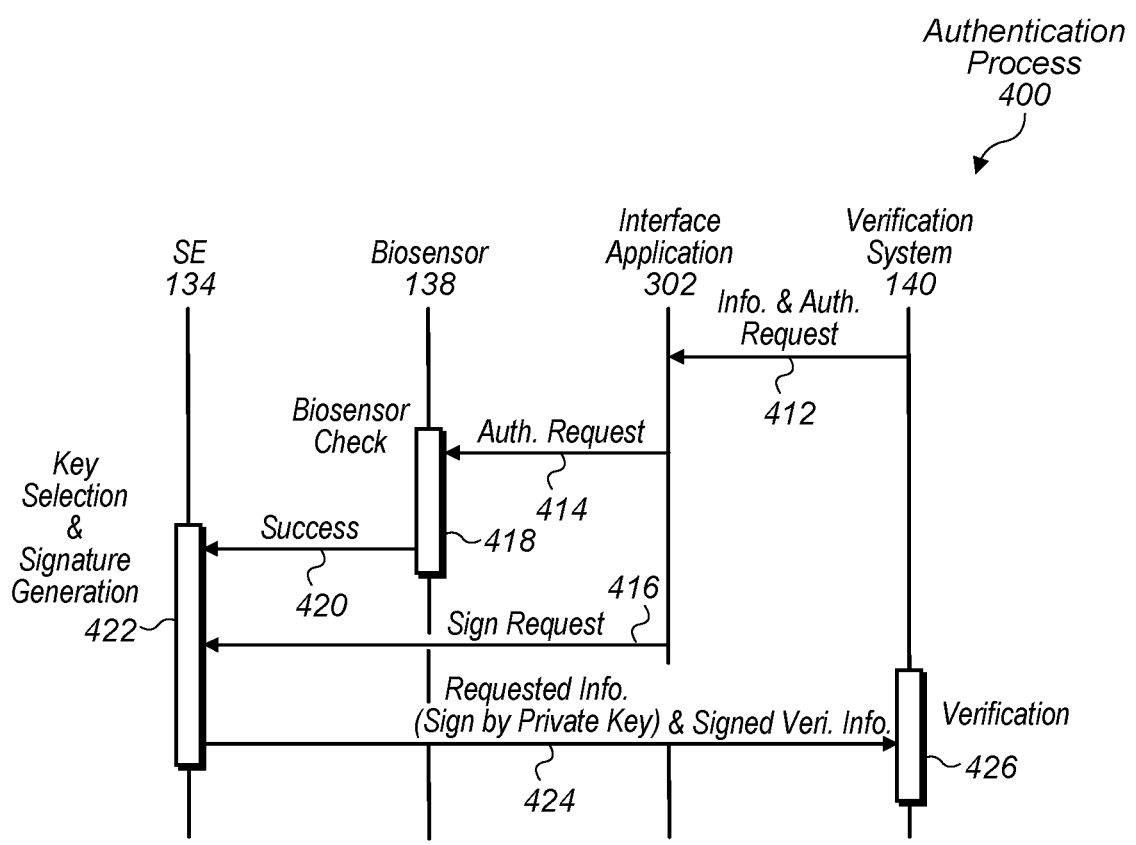
FIG. 4 is a communication diagram illustrating one embodiment of an authentication process used by the authentication system.

Turning now to FIG. 4, a communication diagram of an authentication process 400 is depicted. In various embodiments, authentication process 400 may be performed when a user of mobile device 130 attempts to authenticate with a verification system 140 in order to prove an identity of the user. In the illustrated embodiment, authentication process 400 includes performance of steps 412-426 by interface application 302, SE 134, and verification system 140. In some embodiments, process 400 may be implemented differently than shown.

As shown, authentication process 400 may begin at 412 with verification system 140 issuing, to application 302, a request for identification information 112 and for performance of a biometric authentication. For example, a user may be attempting to perform an online transaction in which a merchant is unable to perform an in-person authentication of the user—and thus wants to rely on mobile device 130 to confirm that the current user is also the holder of identification document 110. At 414, application 302 issues a request to biosensor 138 (or SEP 510 discussed below in some embodiments) to check the identity of the user of mobile device 130. Application 302 may also send a request at 416 to SE 134 to generate a signature using biometric authentication key 136B—the appropriate signing key 136 as determined based on the request verification system 140. At 418, biosensor 138 collects biometric data of the current user for comparison against biometric data corresponding to the holder of identification document 110, which may be established during the previous enrollment process 300. If match is detected, SE 134 may be provided at 420 with an indication of the successful result. SE 134 may then select the appropriate signing key 136 and use it at 422 to sign the information 112 requested by verification system 140. In some embodiments, SE 134 may also sign a challenge included in verification system 140's initial request to prove that signed information 112 is not being replayed from a previous performance of authentication process 400. At 424, SE 134 may provide this signed information along with signed verification information 122 for verification by verification system 140 at 426.

Turning now to FIG. 5A, a flow diagram of a method 500 is depicted. Method 500 is one embodiment of a method that may be performed by a mobile device such as mobile device 130. In some instances, method 500 may allow a user to authenticate using stored identification information and one of multiple private keys of the mobile device.

In step 505, the mobile device receives a request (e.g., provision request at 312) to provision the mobile device with identification information (e.g., identification information identification 112) from an identification document (e.g., identification document 110) issued by an authority to a user for establishing an identity of the user.

In step 510, in response to the received request, the mobile device issues a request (request at 322) for verification information (e.g., signed verification information 122) signed by the authority and usable to verify the identification information. In such an embodiment, the issued request identifies a plurality of public keys (e.g., public keys 206) of the mobile device, each public key having a respective corresponding private key (e.g., signing keys 136) for generating a signature usable to verify the identification information. In some embodiments, the mobile stores one or more of the private keys in a secure element of the mobile device.

In step 515, the mobile device receives the signed verification information, the signed verification information including the plurality of public keys. In some embodiments, receiving the signed verification information includes receiving the identification information from a computing system (e.g., issuing authority system 120) associated with the authority.

In step 520, the mobile device stores the identification information and the signed verification information. In some embodiments, prior to storing the identification information, the mobile device reads the identification information from the identification document.

In some embodiments, method 500 further includes receiving a request (e.g., request at 412) from a verification system (e.g., verification system 140) to provide, at least, a portion of the identification information, selecting, based on the request from the verification system, one of the private keys to generate a signature (e.g., signature 144), and providing, to the verification system, the portion of the identification information, the signed verification information, and the generated signature to facilitate verification of the portion of the identification information. In some embodiments, the request from the verification system asks the mobile device to perform a biometric authentication of a user in conjunction with providing the portion of identification information. In such an embodiment, the selecting includes selecting the private key (e.g., biometric authentication key 136B) based on the private key having a public key described in the signed verification information as being associated with an ability of the mobile device to perform biometric authentications and performing, using a biosensor of the mobile device, the biometric authentication prior to generating the signature. In some embodiments, the request from the verification system asks the mobile device to verify an age of the user satisfies a threshold. In such an embodiment, the selecting includes selecting the private key (e.g., age verification key 136C) based on the private key having a public key described in the signed verification information as being associated with an ability of the mobile device to verify the age of the user and verifying that an age identified in the identification information satisfies the threshold prior to generating the signature. In such an embodiment, the signature is provided to the verification system without providing the age identified in the identification information. In some embodiments, the selected private key is stored in a memory of a dongle inserted into the mobile device. In some embodiments, one of the identified public keys has a private key (e.g., linking key 136F) maintained by entity other than the mobile device, and the other entity is authorized by the authority to provide supplemental information to the verification system related to the provided portion of identification information. In some embodiments, the mobile device uses a near-field communication (NFC) interface (e.g., interface 132) to provide the portion of the identification information, the signed verification information, and the generated signature to the verification system Turning now to FIG. 5B, a flow diagram of a method 530 is depicted. Method 530 is one embodiment of a method that may be performed by a computing system enabling a mobile device to provide identification information such as IA system 120. In some instances, method 530 may allow a user to authenticate using identification information and one of multiple private keys of the mobile device.

In step 535, the computing system receives, from a mobile device (e.g., mobile device 130), a request (e.g., request at 322) for signed verification information (e.g., signed verification information 122) usable to verify identification information (e.g., identification information 112) of an identification document issued by an issuing authority. In such an embodiment, the request includes a plurality of public keys (e.g., public keys 206) of the mobile device, each public key having a respective corresponding private key (e.g., signing key 136) for generating a signature (e.g., signature 144) usable to verify the identification information. In some embodiments, the plurality of public keys is generated by a secure element (e.g., secure element 134) of the mobile device.

In step 540, the computing system creates the signed verification information by including the plurality of public keys in the verification information and signing the verification information (e.g., IA signature 212) with a private key of the issuing authority. In some embodiments, the verification information identifies an ability of the mobile device to perform a biometric authentication and one of the plurality of public keys (e.g., the public key corresponding to biometric authentication key 136B) as being associated with the ability such that the mobile device uses a private key (e.g., biometric authentication key 136B) corresponding the public key in response to a successful performance of the biometric authentication. In some embodiments, the verification information identifies a public key (e.g., the public key corresponding to age verification key 136C) associated with an age specified in the identification document, and the mobile device uses a private key (e.g., age verification key 136C) corresponding to the public key in response to an age verification of a user of the mobile device.

In step 545, the computing system provides the signed verification information to the mobile device. In various embodiments, the mobile device is configured to store the identification information and signed verification information for establishing an identity of a user of the mobile device. In some embodiments, the mobile device maintains one or more private keys of the plurality of public keys in a fast identity online (FIDO) compliant dongle couplable to the mobile device.

Figure 5C:
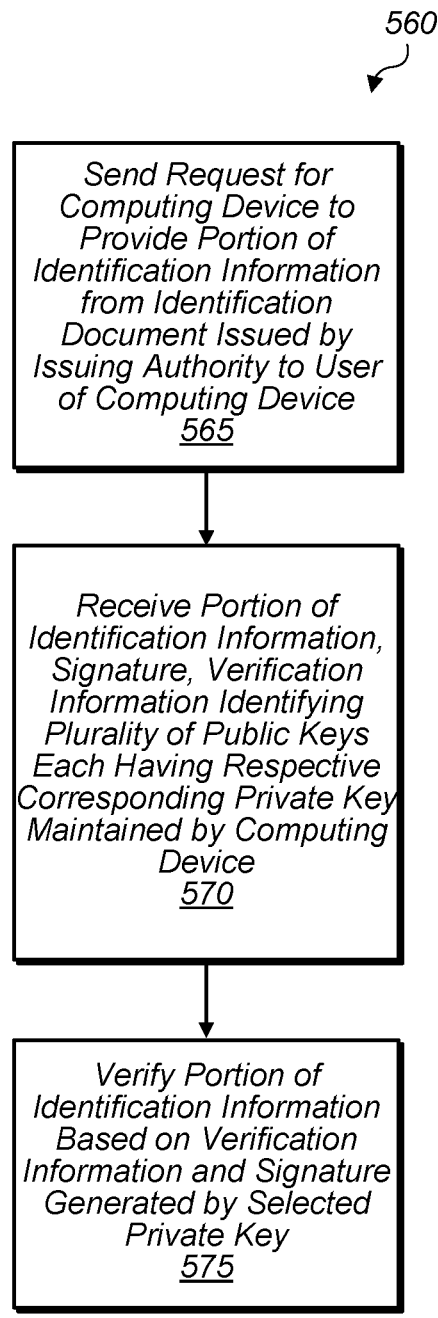

Turning now to FIG. 5C, a flow diagram of a method 560 is depicted. Method 560 is one embodiment of a method performed by a computing system verifying identification information received from a computing device such as verification system 140. In some instances, method 560 may allow a user to authenticate using identification information and one of multiple private keys of the computing device.

In step 565, the computing system sends a request (e.g., request at 412) for a computing device (e.g., mobile device 130) to provide a portion of identification information (e.g., identification information 112) from an identification document issued by an issuing authority to a user of the computing device. In some embodiments, the request asks for the computing device to perform a biometric authentication of the user prior to providing the portion of identification information. In some embodiments, the portion is a confirmation that the user satisfies an age threshold.

In step 570, the computing system receives the portion of identification information, a signature (e.g., signature 144), verification information (e.g., signed verification information 122) identifying a plurality of public keys (e.g., public keys 206) each having a respective corresponding private key (e.g., signing keys 136) maintained by the computing device. In such an embodiment, the signature is generated by a selected one of the private keys based on the requested portion of identification information. In some embodiments, one of the plurality of public keys (e.g., the public key 206 of biometric authentication key 136B) is identified in the verification information as being associated with an ability of the computing device to perform a biometric authentication, and the signature is generated by the private key responsive to the computing device performing a successful biometric authentication. In some embodiments, one of the plurality of public keys (e.g., the public key 206 of age verification key 136C) is identified in the verification information as being associated with an age verification, and the private key (e.g., age verification key 136C) is selected based on the public key of the private key being identified as being associated with the age verification. In some embodiments, the signature is generated by a fast identity online (FIDO) compliant dongle coupled to the computing device.

In step 575, the computing system verifies the portion of identification information based on the verification information and the signature generated by the selected private key. In some embodiments, the signature is generated by a secure element (e.g., secure element 134) of the computing device and received via a near-field communication (NFC) interface (e.g., interface 132) of the computing device.

Figure 6:
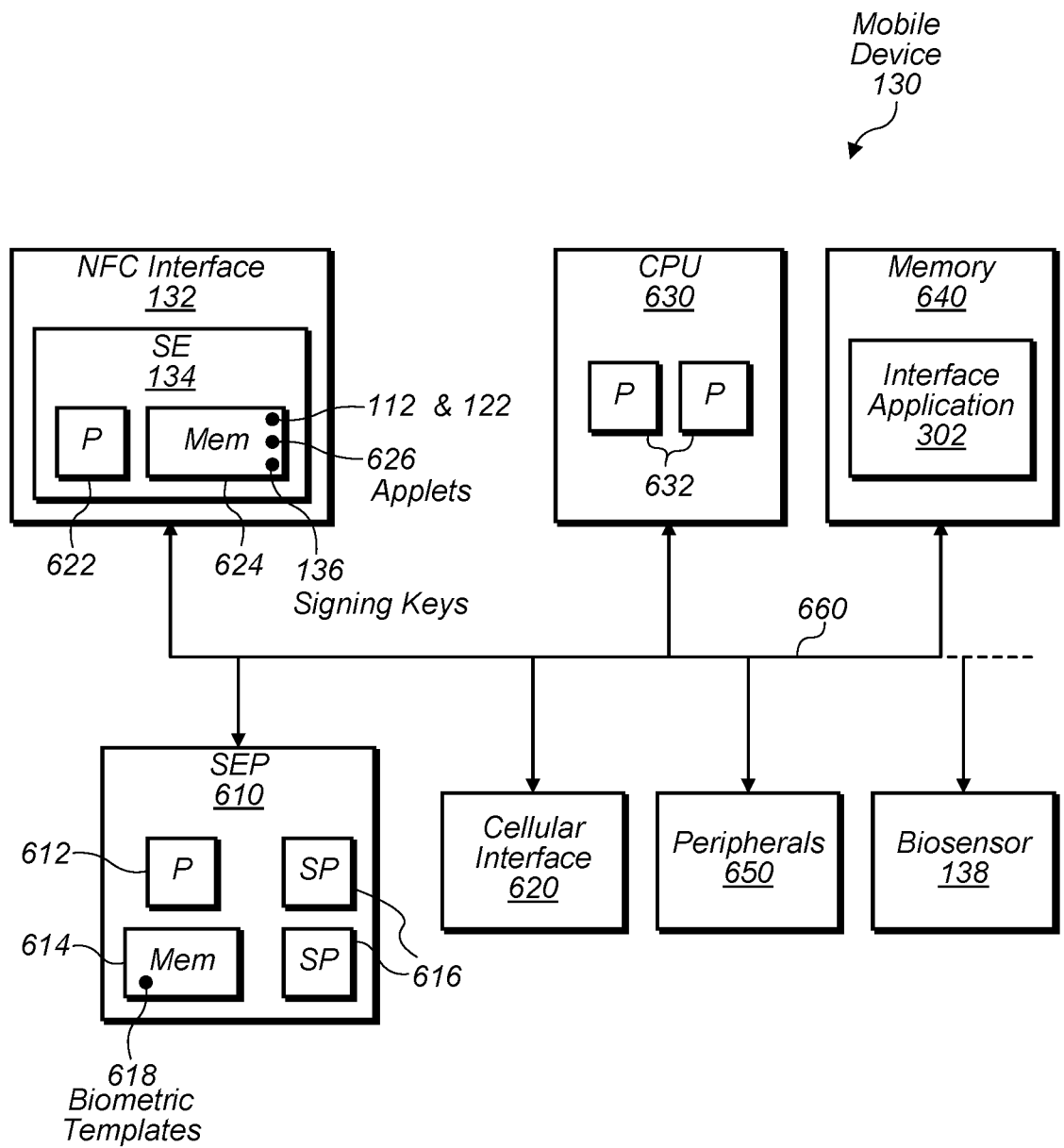
FIG. 6 is a block diagram illustrating one embodiment of the mobile device.

Turning now to FIG. 6, a block diagram of a mobile device 130 is depicted. As noted above, mobile device 130 may include NFC interface 132, SE 134, and biosensor 138. In the illustrated embodiments, mobile device 130 further includes a secure enclave processor (SEP) 610, cellular interface 620, CPU 630, memory 640, peripherals 650 coupled via a communication fabric 660. As shown, SEP 610 may include one or more processors P 612, a secure memory 614, and one or more security peripherals 616. SE 134 may include one or more processors P 622 and a memory 624. CPU 630 may include one or more processors P 632. Memory 640 may store interface application 302. In some embodiments, mobile device 130 may be implemented differently from shown.

SEP 610, in various embodiments, is configured to maintain previously captured biometric data of an authorized user and compare it against newly received data captured by biosensor 138 in order to authenticate a user. (In another embodiment, biosensor 138 or SE 134 may perform the comparison.) In the illustrated embodiment, SEP 610 is configured to maintain biometric data in the form of biometric templates 618, which may be used in a comparison with data collected biosensor 138. Templates 618 may be generated from any suitable form of biometric data such as those discussed above. Although depicted in memory 614, in some embodiments, SEP 610 may store multiple templates 618 in memory 640 but encrypt templates 618 using a cryptographic key maintained in memory 614. In various embodiments, communications between SEP 610, SE 134, and biosensor 138 are encrypted such that another entity, such as CPU 630, is unable to view their communications.

In various embodiments, SEP 610 implements a secure element, distinct from SE 134, in order to securely store biometric data. Accordingly, in various embodiments, SEP 610 is isolated from the rest of the mobile device 130 except for a carefully controlled interface (thus forming a secure enclave for SEP processor 612, secure memory 614, and security peripherals 616). Because the interface to SEP 610 is carefully controlled, direct access to SEP processor 612, secure memory 614, and security peripherals 616 may be prevented. In one embodiment, a secure mailbox mechanism may be implemented. In the secure mailbox mechanism, external devices may transmit messages to an inbox. SEP processor 612 may read and interpret the message, determining the actions to take in response to the message. Response messages from the SEP processor 612 may be transmitted through an outbox, which is also part of the secure mailbox mechanism. Other interfaces that permit only the passing of commands/requests from the external components and results to the external components may be used. No other access from the external devices to SEP 610 may be permitted, and thus the SEP 610 may be "protected from access". More particularly, software executed anywhere outside SEP 610 may be prevented from direct access to the secure components with the SEP 610. SEP processor 612 may determine whether a command is to be performed. In some cases, the determination of whether or not to perform the command may be affected by the source of the command. That is, a command may be permitted from one source but not from another.

In some embodiments, SEP processor 612 may execute securely loaded software that facilitates implementing functionality descried with respect to SEP 610. For example, a secure memory 614 may include software executable by SEP processor 612. One or more of the security peripherals 616 may have an external interface, which may be connected to a source of software (e.g. a non-volatile memory such as Flash memory). In another embodiment, the source of software may be a non-volatile memory coupled to another peripheral 616, and the software may be encrypted to avoid observation by a third party. The software from the source may be authenticated or otherwise verified as secure, and may be executable by SEP processor 612. In some embodiments, software may be loaded into a trust zone in memory 614 that is assigned to the SEP 610, and SEP processor 612 may fetch the software from the trust zone for execution. The software may be stored in the memory 640 in encrypted form to avoid observation. Despite the steps taken to ensure security of the secure software, the secure software may still be prevented from directly accessing/obtaining stored private keys. Only hardware may have access to private keys, in an embodiment.

Security peripherals 616 may be hardware configured to assist in the secure services performed by SEP 610. Accordingly, security peripherals 616 may include authentication hardware implementing/accelerating various authentication algorithms, encryption hardware configured to perform/accelerate encryption, secure interface controllers configured to communicate over a secure interface to an external (to mobile device 130) device, etc.

In some embodiments, SE 134 may implement similar functionality as SEP 610 in order to restrict access to confidential information stored in memory 624 such as identification information 112, verification information 122, and signing keys 136. For example, SE 134 may implement a mailbox to restrict access to processor 622 and memory 624. In various embodiments, SE processor 622 also executes securely loaded software in order to implement functionality described herein such as applets 626 stored in memory 624.

Applets 626, in one embodiment, are executable, in conjunction with application 302, to perform enrollment of mobile device 130 and authentication with a reader 142. With respect to enrollment, applets 626 may be executable to receive ID information 112 and/or verification information 122 from IA system 120. In some embodiments, applets 626 are executable to generate signing keys 136 and corresponding public keys 208 as well as obtain corresponding signing key metadata 124, which may be stored in memory 624. With respect to authentication, applets 626 may service requests for information 112 from readers 142 and may process comparison results indicated by SEP 610. In some embodiments, if a particular comparison performed by SEP 610 does not result in a match, SE 134 may be configured to restrict (or stop) execution an applet 626 in order to prevent it from servicing a request from information 112 from a reader 142.

Cellular Interface 620, in one embodiment, is a long-range radio configured to facilitate interaction between mobile device 130 and one or more external systems such as systems 120 and 140. Cellular link 620 may include suitable circuitry for interfacing with long-range networks such as a baseband processor, analog RF signal processing circuitry (e.g., including filters, mixers, oscillators, amplifiers, etc.), digital processing circuitry (e.g., for digital modulation as well as other digital processing), one or more antennas, etc. Cellular interface 620 may be configured to communicate using any of multiple radio access technologies/wireless communication protocols such as GSM, UMTS, CDMA2000, LTE, LTE-A, etc.

As mentioned above, CPU 630 may include one or more processors 632. Generally, a processor may include circuitry configured to execute instructions defined in an instruction set architecture implemented by the processor. Processors 632 may include (or correspond to) processor cores implemented on an integrated circuit with other components as a system on a chip (SOC) or other levels of integration. Processors 632 may further include discrete microprocessors, processor cores and/or microprocessors integrated into multichip module implementations, processors implemented as multiple integrated circuits, etc.

Processors 632 may execute the main control software of the system, such as an operating system. Generally, software executed by CPU 630 during use may control the other components of the system to realize the desired functionality of the system. The processors may also execute other software. These applications may provide user functionality, and may rely on the operating system for lower-level device control, scheduling, memory management, etc. Accordingly, processors 632 (or CPU 630) may also be referred to as application processors. CPU 630 may further include other hardware such as an L2 cache and/or an interface to the other components of the system (e.g. an interface to the communication fabric 660).

Memory 640 may generally include the circuitry for storing data. For example, memory 640 may be static random access memory (SRAM), dynamic RAM (DRAM) such as synchronous DRAM (SDRAM) including double data rate (DDR, DDR2, DDR3, DDR4, etc.) DRAM. Low power/mobile versions of the DDR DRAM may be supported (e.g. LPDDR, mDDR, etc.). Device 130 may include a memory controller (not shown) that may include queues for memory operations, for ordering (and potentially reordering) the operations and presenting the operations to the memory 640. The memory controller may further include data buffers to store write data awaiting write to memory and read data awaiting return to the source of the memory operation. In some embodiments, the memory controller may include a memory cache to store recently accessed memory data. In some embodiments, memory 640 may include program instructions, such as instructions of interface application 302, that are executable by one or more processors 632 to cause device 130 to perform various functionality described herein with respect to device 130.

Peripherals 650 may be any set of additional hardware functionality included in device 130. For example, peripherals 650 may include video peripherals such as an image signal processor configured to process image capture data from a camera or other image sensor, display controllers configured to display video data on one or more display devices, graphics processing units (GPUs), video encoder/decoders, scalers, rotators, blenders, etc. Peripherals 650 may include audio peripherals such as microphones, speakers, interfaces to microphones and speakers, audio processors, digital signal processors, mixers, etc. Peripherals 650 may include interface controllers for various interfaces including interfaces such as Universal Serial Bus (USB), peripheral component interconnect (PCI) including PCI Express (PCIe), serial and parallel ports, etc. Peripherals 650 may include networking peripherals such as media access controllers (MACs). Any set of hardware may be included.

Communication fabric 660 may be any communication interconnect and protocol for communicating among the components of device 130. Communication fabric 660 may be bus-based, including shared bus configurations, cross bar configurations, and hierarchical buses with bridges. Communication fabric 660 may also be packet-based, and may be hierarchical with bridges, cross bar, point-to-point, or other interconnects.

Although FIG. 6 depicts components within mobile device 130, it is noted that similar components may exist in computer systems used to implement other functionality described herein such as functionality described with respect to IA system 120 and verification system 140. Accordingly, these systems may also include CPUs, memory, various network interfaces, and peripherals such as those described above.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A non-transitory computer readable medium having program instructions stored therein that are executable by a mobile device including a secure element to perform operations comprising:
receiving a request to provision the mobile device with identification information from a physical identification document issued by an authority to a user for establishing an identity of the user;
generating, by the secure element, a plurality of signature public key pairs that are each to be associated with a different respective verification in a user authentication exchange involving the identification information;
in response to the received request, issuing, to a system associated with the authority, a request for verification information signed by the authority and usable to verify the identification information, wherein the issued request identifies public keys of the plurality of signature public key pairs;
receiving the signed verification information, wherein the signed verification information includes the public keys and defines the different respective verifications associated with their corresponding signature public key pairs such that a first private key of the public key pairs is to be used to generate a signature in response to performing a first of the different respect verifications and a second private key of the public key pairs is to be used to generate a signature in response to performing a second of the different respect verifications; and
storing the identification information and the signed verification information in the secure element to cause the secure element to restrict access to the stored information based on a user authentication.

2. The computer readable medium of claim 1, wherein the operations further comprise:
receiving a request from a verification system to provide, at least, a portion of the identification information and to perform one of the different respective verifications defined in the signed verification information;
selecting the particular one of the private keys associated with the requested different respective verification to generate a signature; and
providing, to the verification system and from the secure element, the portion of the identification information, the signed verification information, and the generated signature to facilitate verification of the portion of the identification information.

3. The computer readable medium of claim 2, wherein the requested different respective verification includes the mobile device performing a biometric authentication of a user in conjunction with providing the portion of identification information; and
wherein the selecting includes:
selecting the private key based on the private key having a public key described in the signed verification information as being associated with an ability of the mobile device to perform biometric authentications; and
performing, using a biosensor of the mobile device, the biometric authentication prior to generating the signature.

4. The computer readable medium of claim 2, wherein the requested different respective verification includes the mobile device verifying an age of the user satisfies a threshold;
wherein the selecting includes:
selecting the private key based on the private key having a public key described in the signed verification information as being associated with an ability of the mobile device to verify the age of the user; and
verifying that an age identified in the identification information satisfies the threshold prior to generating the signature; and
wherein the signature is provided to the verification system without providing the age identified in the identification information.

5. The computer readable medium of claim 1, wherein the signed verification information includes an additional public key associated with a private key is stored in a memory of a dongle inserted into the mobile device, and wherein the signed verification information defines a respective verification associated with the additional public key.

6. The computer readable medium of claim 2, wherein the signed verification information includes an additional public key associated with a private key maintained by entity other than the mobile device, wherein the other entity is authorized by the authority via the signed verification information to provide supplemental information to the verification system related to the provided portion of identification information.

7. The computer readable medium of claim 2, wherein the mobile device uses a near-field communication (NFC) interface to provide the portion of the identification information, the signed verification information, and the generated signature to the verification system.

8. The computer readable medium of claim 1, wherein the signed verification information defines, for a particular one of the corresponding public key pairs, performing a biometric authentication before using the private key of the particular public key pair to generate a signature associated with verifying, at least, a portion of the identification information.

9. The computer readable medium of claim 1, wherein the signed verification information is a certificate that includes the public keys and defines the different respective verifications associated with their corresponding signature public key pairs.

10. A method, comprising:
receiving, by a computing system and from a mobile device, a request for signed verification information usable to verify identification information of an identification document issued by an issuing authority, wherein the request includes a plurality of public keys of the mobile device, each public key having a respective corresponding private key for generating a signature usable to verify the identification information, and wherein first and second ones of the plurality of public keys are generated by the mobile device and are each associated with a different verification in a user authentication exchange involving the identification information;
creating, by the computing system, the signed verification information by including the plurality of public keys in the verification information, defining a first verification associated with the first public key and a second, different verification associated with the second public key, and signing the verification information with a private key of the issuing authority; and providing, by the computing system, the signed verification information to the mobile device, wherein the mobile device is configured to store the identification information and signed verification information in a secure element of the mobile device for establishing an identity of a user of the mobile device.

11. The method of claim 10, wherein the first and second public keys are generated by the secure element of the mobile device.

12. The method of claim 10, wherein the verification information identifies an ability of the mobile device to perform a biometric authentication and one of the plurality of public keys as being associated with the ability such that the mobile device uses a private key corresponding the public key in response to a successful performance of the biometric authentication.

13. The method of claim 10, wherein the verification information identifies a public key associated with an age specified in the identification document, and wherein the mobile device uses a private key corresponding to the public key in response to an age verification of a user of the mobile device.

14. The method of claim 10, wherein the mobile device maintains one or more private keys of the plurality of public keys in a fast identity online (FIDO) compliant dongle couplable to the mobile device.

15. A method, comprising:
sending, by a computing system, a request for a computing device to provide, as part of a user authentication exchange, a portion of identification information from an identification document issued by an issuing authority to a user of the computing device;
receiving, by the computing system and from a secure element of the computing device, the portion of identification information, a signature, and signed verification information identifying a plurality of public keys, each having a respective corresponding private key maintained by the computing device, wherein the signature is generated by a selected one of the private keys based on the requested portion of identification information, and wherein a first and a second of the plurality of public keys are generated by the secure element of the computing device and are each associated with a different verification in the user authentication exchange involving the identification information, wherein the signed verification information includes a first description defining a first verification associated with the first public key and a second description defining a second verification associated with the second public key; and
verifying, by the computing system, the portion of identification information based on the signed verification information and the signature generated by the selected private key, wherein the verifying including accessing a description included in the signed verification information and defining the different verification associated with a public key corresponding to the private key.

16. The method of claim 15, wherein the request asks for the computing device to perform a biometric authentication of the user prior to providing the portion of identification information;
wherein one of the plurality of public keys is identified in the verification information as being associated with an ability of the computing device to perform a biometric authentication; and
wherein the signature is generated by the private key responsive to the computing device performing a successful biometric authentication.

17. The method of claim 15, wherein the portion is a confirmation that the user satisfies an age threshold;
wherein one of the plurality of public keys is identified in the verification information as being associated with an age verification; and
wherein the private key is selected based on the public key of the private key being identified as being associated with the age verification.

18. The method of claim 15, wherein the signature is generated by a fast identity online (FIDO) compliant dongle coupled to the computing device.

19. The method of claim 15, wherein the signature is generated by the secure element of the computing device and received via a near-field communication (NFC) interface of the computing device.

* * * * *